United States Patent [19]

Shoichi

[11] 4,359,606
[45] Nov. 16, 1982

[54] VOICE SWITCHING CONTROL SYSTEM

[75] Inventor: Sato Shoichi, Minou, Japan

[73] Assignee: Toa Electric Co., Ltd., Hyogo, Japan

[21] Appl. No.: 253,631

[22] PCT Filed: May 11, 1979

[86] PCT No.: PCT/JP79/00120
§ 371 Date: Jul. 23, 1980
§ 102(e) Date: Jul. 23, 1980

[87] PCT Pub. No.: WO80/02627
PCT Pub. Date: Nov. 27, 1980

[51] Int. Cl.³ ............................................. H04M 9/00
[52] U.S. Cl. .............................. 179/1 VC; 179/1 HF
[58] Field of Search .................. 179/1 H, 1 HF, 1 VC, 179/1 SW, 1 CN, 18 BC, 81 B

[56] References Cited

U.S. PATENT DOCUMENTS 3,755,625 8/1973 Maston ............................. 179/1 CN
4,139,731 2/1979 Hashemi et al. .................. 179/1 CN

FOREIGN PATENT DOCUMENTS 37-17326 10/1962 Japan .
46-22281 6/1971 Japan .
46-36074 10/1971 Japan .
50-19304 2/1975 Japan .

OTHER PUBLICATIONS

"On the Study of Voice Switching Control", by J. Takahaski et al., Proceedings of Acoustic Engineering Society of Japan, pp. 485–486, Oct. 1973.

Primary Examiner—Joseph A. Popek
Attorney, Agent, or Firm—Wenderoth, Lind & Ponack

[57] ABSTRACT

Disclosed is an improved voice switching control system for controlling a plurality of voice switches disposed in voice signal transmission channels between at least two stations each including a loudspeaker for receiving voice signals and a microphone for transmitting voice signals. In accordance with the outputs of comparators, each for comparing the output voice signal with the input voice signal of the same station, either one J-K Flip-Flop or a plurality of J-K Flip-Flops control the voice switches in a complementary manner. A new insertion of a voice message into any one of the stations serves to interrupt the voice message which has been transmitted from another station, and the newly inserted voice message will be transmitted to any other station.

6 Claims, 3 Drawing Figures

VOICE SWITCHING CONTROL SYSTEM

FIELD OF THE INVENTION

The present invention relates to a voice switching control for use in a bidirectional voice-communication system including loudspeaker type telephone instruments or interphone instruments or the like, and more particularly to a control system for controlling audio signals on voice transmission lines between such instruments.

BACKGROUND ART

As is known in the art, a loudspeaker type telephone instrument has a microphone for transmitting voice signals and a loudspeaker for receiving voice signals transmitted from the microphone of another loudspeaker type telephone instrument.

The loudspeaker is capable of emitting a relatively large amount of sound energy, much more than the amount of sound energy emitted by an earphone of a conventional handheld telephone instrument. The loudspeaker and the microphone of a loudspeaker or hand-free type of telephone instrument are assembled in a relatively close relationship within the same casing or cabinet of the instrument. Inevitably, the loudspeaker is acoustically coupled with the microphone in a strong manner. An interphone instrument also has a pair of electric/acoustic and acoustic/electric converters which are acoustically coupled with each other.

The acoustic coupling between a pair of converters (loudspeaker and microphone) of a hand-free telephone instrument and/or interphone apparatus is apt to produce a number of adverse effects on the bidirectional voice-communication system with a pair of hand-free telephone or interphone instruments.

For example, assuming that a first microphone of a first hand-free telephone instrument is connected via a voice transmission line or channel to a second loudspeaker of second hand-free telephone instrument and that a second microphone of the second telephone instrument is connected via another voice transmission line to a first loudspeaker of the first telephone instrument, an acoustic energy inputted to the first microphone is fed back to itself, because a closed loop is formed owing to the acoustic coupling between the loudspeaker and the corresponding microphone. The level of the fed-back signal often becomes high enough to produce a howling.

With a view that a relatively strong acoustic coupling between the loudspeaker and the microphone is inevitable, one and probably the only technique to completely eliminate the occurrence of howling is to provide control means for disconnecting or substantially disconnecting one or more voice transmission channels so that no closed loop is formed during operation, thus making a selected voice transmission channel which is required to transmit a voice message.

Such a control means or system is called "voice switching control system" which is the subject matter of the present invention.

A typical prior voice switching control system includes a pair of voice switches or variolossers. One of the voice switches is disposed in a first voice transmission line or channel between a first microphone of the first telephone or interphone instrument or station and a second loudspeaker of the second station. The other of the voice switches is disposed in a second voice transmission line between a second microphone of the second station and a first loudspeaker of the first station. In operation, a pair of voice transmission lines is energized in a complementary manner by the switching of the two voice switches which introduces two different attenuation (loss) factors in voice signals from associated microphones. The operation mode ("ON or OFF state") of the voice switches is controlled by a control circuit which monitors a pair of outputs from the first and second microphones, i.e.—the voice signal conditions in the first and second voice transmission lines ahead of the voice switches. The two outputs are passed through wave shaping circuits to be compared by a comparator. Whenever the level of the first microphone output voice signal in the first voice transmission line is greater than the level of the second microphone output voice signal in the second voice transmission line, the comparator controls the first voice switch to remain "ON" and controls the second voice switch to remain "OFF", and vice versa. Accordingly, no closed loop is formed during operation. However, owing to the strong acoustic-loudspeaker/microphone-coupling and since it is necessary to reproduce a high level of sound at a loudspeaker, the level of output from the microphone of the station which is receiving a voice message from other station becomes comparable to and sometimes greater than the level of output from the other microphone of the other station. If this occurs, a message cannot be transmitted. Therefore, the control circuit usually includes a pair of auxiliary variolossers, each of which is disposed in the connecting line between an associated voice signal (output of microphone) pick-up point on the transmission line and an associated wave shaping circuit. The comparator controls the auxiliary variolossers in a similar manner to the way it controls the associated main variolossers or voice switches on the transmission lines thereby eliminate the malfunction described above.

However, the combination of main and auxiliary variolossers makes it difficult or impossible to interrupt a message from a first station and to insert a new message from a second station to be transmitted to the first station.

Without the strong acoustic coupling between a loudspeaker and a microphone, there would be nothing to it. Therefore, the above described disadvantage in the prior art system is another consequence derived from the inevitable existance of a strong acoustic coupling.

Disclosed in the Japanese Patent Publication No. 22281/1971 is a voice switching control system which also controls a pair of voice switches in transmission lines by sensing the outputs of microphones as described above. However, instead of using a pair of auxiliary variolossers as described above, the system employs four sensed signal amplifiers, two of which have different gains from the other two, disposed in sensed signal branches, and a pair of comparators whose outputs are connected to a second-stage comparator for controlling the voice switches, the second-stage comparator being comprised of a pair of cross-coupled NAND gates. This arrangement ensures that the first and second voice switches are operated in an exclusive 'OR' (complementary) manner. However, while a talker at a first station is "continuously or incessantly" speaking to the first microphone, it is very difficult for an other person at a second station to interrupt the speech and to insert a new message which he wishes to transmit to the first station. As a conclusion, this system also has a defect similar to that of the first-mentioned prior art system.

Disclosed in a paper entitled "On the study of Voice Switching Control" by J. Takahashi et al, in the Proceedings of the Acoustic Engineering Society of Japan, pages 485–486, October 1973, is a voice switching control system which senses the levels of voice signals at four points, namely two sets of a pair of outputs and inputs, from and to the microphones and the loudspeakers of the first and second stations.

The input to the loudspeaker and the output from the microphone of each station are compared by a comparator. The pair of output signals obtained from the two comparators are applied to a logic circuit having three states or positions and which controls a pair of variolossers. A first position defines an "ON or no attenuation state"; a third position defines an "OFF or full attenuation state" and a second or intermediate position defines a "some attenuation (half the full attenuation) state".

More specifically, the comparator provides a high level signal to the logic circuit only when the level of the output from the microphone (first input to the comparator) is greater than the level of the input to the loudspeaker (second input to the comparator) by a predetermined value, and otherwise produces a low level signal. While the first comparator for comparing the microphone output and the loudspeaker input of the first station is producing a high level signal and the second comparator for comparing the microphone output and loud-speaker input of the second station is producing a low level signal, (namely, while only the user at the first station speaks to the microphone of the first station), the logic circuit controls the first variolosser to be placed in its 'first (no attenuation) position' to transmit a voice message from the first station to the second, and controls the second variolosser to be placed in its 'third (full attenuation) position'. While both the first and second comparators are producing high level signals (namely, while both the users at first and second stations speak to the microphones at an appropriate sound level), the logic circuit controls both of the first and second variolossers to be placed in their 'second (half the full attenuation) position'.

Such arrangement and control makes it easy to insert a new voice message by the user at one station while the other user at the other station is transmitting a message because the comparator is arranged to compare the output from the microphone with the input to the loudspeaker of the same station.

However, the inserted new voice message is transmitted to the other station with a relatively restricted level of sound during the transient, simultaneous or full duplex voice communication mode of operation, because both of the variolossers introduce half the full attenuation in the voice signals in this mode. Furthermore, a closed loop for voice signals is formed. In order to avoid howling, the overall gain for the closed loop must be less than the value of gain defining a critical oscillation condition. These restrictions on the amplitude of voice signals during such transient, simultaneous voice communication make it difficult to obtain a sufficiently high level of sound at the output of a loudspeaker. Consequently, the listener often cannot perceive or hear the voice information clearly.

A delay element comprising a waveshaping circuit is interposed between the voice signal pick-up point and the control input to the comparator. The delay element delays the switching of a variolosser. Accordingly, the beginning portion of a voice message is not transmitted from one station to the other.

In general, it is desirable that voice switching control system for controlling loudspeaker type stations satisfy the following requirements:

(1) no howling, (2) a high level of sound at the output of the loudspeaker of the station, (3) easy to interrupt the voice message from the other station and to insert and transmit a new message from one station to the other, and (4) little or no risk of malfunction due to ambient noises around the station.

However, each of the above requirements conflicts with one or more of the others to some extent as discussed above. All the prior art systems represent a compromise between these rather conflicting requirements, and leave room for improvement.

It is highly desirable that the voice switching control system be applicable to a telephone conference communication system including at least three loudspeaker type stations by which a conference is held.

DISCLOSURE OF THE INVENTION

With this background of the invention in mind it is therefore an object of the present invention to provide an improved voice switching control system which satisfies the requirements as described above to a maximum degree.

It is another object of the present invention to provide a voice switching control system which is applicable to a telephone conference communication system including at least three loudspeaker type stations by which a conference is held.

It is still another object of the present invention to provide a voice switching control system wherein a message from another station can be surely interrupted by the insertion of a new message from one station and the newly inserted message is transmitted to the other station (or the other stations) without attenuation or loss of the message signal, and without introducing the switching delay of voice switch.

In accordance with the present invention, a voice switching control system for controlling voice signals for transmission between stations each including a microphone and a loudspeaker comprises: at least two voice switches disposed in different voice signal transmission lines or channels respectively; each of the transmission lines being operatively connected between the microphone of one of the stations and the loudspeaker of the other stations; means for sensing each output voice signal of the microphones of the stations and each input voice signal of the loud-speakers of the stations; comparators each for comparing the output of the microphone of one of the stations with the input voice signal of the loudspeaker of the same station; each one thereof selectively producing either a first signal or a second signal in accordance with the relative amplitudes of the output voice signal of the associated microphone and the input voice signal of the associated loudspeaker; logic circuits for controlling an associated voice switch at a selected one of two positions, a first position defining an ON state of the voice switch and a second position defining an OFF state of the voice switch; each of the logic circuits having a first control input for receiving the output of its associated comparator and a second control input for receiving the outputs of the other comparators; and each logic circuit being set to control its associated voice switch at its first position upon receiving, at its first control input, the first signal from the associated comparator and receiving, at its second control input, the second signal from any of the other comparators, each of the logic circuits being reset to control its associated voice switch at its second position upon receiving, at its first control input, the second signal from its associated comparator and receiving, at its second control input, of the first signal from any of the other comparators, the logic state of each of the logic circuits being inverted to control its associated voice switch so as to invert the position thereof upon receiving, at its first control input, the first signal from its associated comparator and receiving, at its second control input, the first signal from any of the other comparators, whereby a newly inserted voice message fed into a microphone of any one of the stations serves to interrupt another voice message which has been transmitted to the loudspeaker associated with the microphone, and whereby the newly inserted message is transmitted to any other station without attenuation of the voice signal introduced by its associated voice signal switch.

Preferably, each of the logic circuits may comprise a conventional J-K Flip-Flop. The low cost and simple design of the Flip-Flop helps to lower the total cost and to simplify the construction of the voice switching system.

For a voice switching control system for controlling a pair of voice signals transmitted between a pair of the stations, a single (and common) J-K Flip-Flop for controlling a pair of the voice switches may preferably be used instead of two J-K Flip-Flops for controlling one and the other of the two voice switches, respectively. More specifically, the first control input (J input) of the single J-K Flip-Flop is connected to the first comparator for comparing the input of the first station with its output while the second control input (K input) is connected to the second comparator for comparing the input and output of the second station. The Q output of the J-K Flip-Flop is connected to the first voice switch and the $\bar{Q}$ output of the J-K Flip-Flop is connected to the second voice switch.

The sensing means or voice signal pick-up means includes amplifying means for amplifying voice signals and rectifying means for rectifying the amplified signals.

Thus, each output voice signal of each microphone and each input voice signal of each loudspeaker is amplified and rectified. Each rectified signal representing the instantaneous amplitude of input voice signal to the loudspeaker is further smoothed by a smoothing circuit in order to reduce the risk of a malfunction of the comparator due to the temporary increase or decrease in amplitude of the input voice signal to the loudspeaker. However, each rectified signal representing the amplitude of an output voice signal of the microphone is directly connected to the comparator portion in order to rapidly activate the comparator to turn on the associated voice switch. With such an asymmetric arrangement, the beginning portion of the voice message is clearly transferred from the station into which the voice message is inserted to the other stations. The beginning or head portion of voice message is regarded as the most important segment of information because it usually is a critical factor for listeners in determining their comprehension of the voice message.

The comparator portion of the voice switching control system includes a subtracting element for subtracting the amplified, rectified and smoothed signal Vi (input signal to the loudspeaker) from the amplified and rectified but not smoothed signal Vo (output signal from the microphone of the same station). The subtracted signal (Vo-Vi) is then compared with a preselected reference voltage signal by a comparating circuit which produces a logic '1' signal when the subtracted signal is greater than the reference or threshold voltage and produces a logic '0' signal when the subtracted voltage is less than the threshold voltage.

BRIEF DESCRIPTION OF THE DRAWINGS

The above-mentioned and other features of the present invention will become more apparent by reference to the following description together with the accompanying drawings, in which.

DESCRIPTION OF THE PREFERRED EMBODIMENTS

Figure 1:
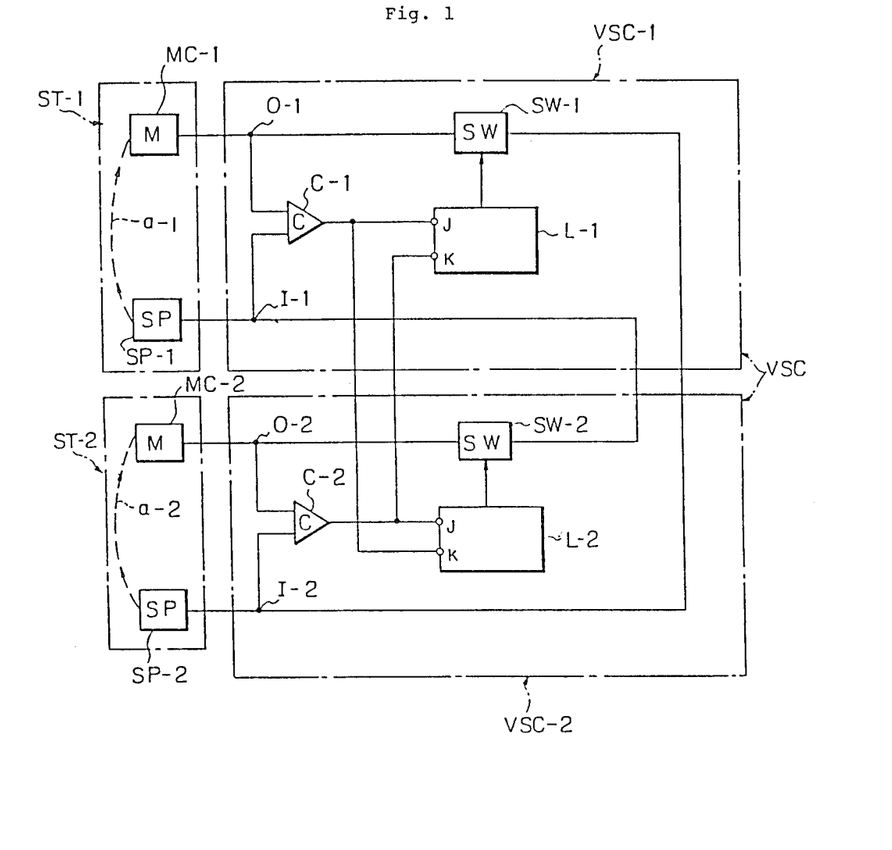
FIG. 1 is a block diagram of a voice switching control system for controlling two voice switches in accordance with the present invention.

Referring now to FIG. 1, a voice switching control system in accordance with the present invention is shown and generally designated by VSC. In this embodiment, the control system comprises two voice switching control units VSC-1 and VSC-2 and is arranged to control two voice switches SW-1 and SW-2 in the voice transmission channels between two stations ST-1 and ST-2. However, it is noted that the number "two" is only exemplary and that the present invention is equally and easily applicable to a voice switching system for controlling three or more different voice signals between three or more stations, which will be apparent hereinafter.

Each station has a microphone (e.g. MC-1) for transmission of voice signals and a loudspeaker (e.g. SP-1) for receiving voice signals from another station. As described above, the acoustic output of the loudspeaker is relatively large during normal loudspeaker operation. Due to the closely spaced relationship of the loudspeaker and the microphone, some of a relatively large amount of acoustic energy from the loudspeaker is acoustically coupled to its associated microphone as shown by the dotted line a-1 or a-2.

A voice switch (e.g. SW-1) is disposed in the voice signal transmission line or channel between the microphone (e.g. MC-1) of one of the stations and the loudspeaker (e.g. SP-2) of the other station and is operated to selectively activate the voice transmission line to transmit voice signals from one station to the other.

Each voice switching control unit (e.g. VSC-1) senses or picks up the voice signal output and input of the associated station (e.g. ST-1) at a point (O-1) ahead of the associated voice switch (SW-1) and at a point (I-1) on an input line to the loudspeaker of the station, respectively.

A comparator (eg. C-1) compares a pair of sensed signals. When the output of the microphone is greater in amplitude than the input to the loudspeaker of the same station, the comparator produces a first signal (e.g. 'High' level signal) and when the output is less than the input, the comparator produces a second signal (e.g. 'Low' level signal). The output of the comparator (C-1) is connected to a first control input (J) of an associated logic circuit (L-1) and is connected to a second control input (K) of the other logic circuit (L-2). When applied to a control system for controlling more than two voice switches, the output of the comparator is connected to all of the other logic circuits. For such multi-control systems, the number of logic circuits is equal to the number of voice switches. However, for a two-voice-switches control system, a single logic element may be used. Such a preferred embodiment will be described in more detail hereinafter.

Each logic circuit (e.g. L-1) controls its associated voice switch (SW-1) at a selected one of the two positions, a first position defining an effectively or practically 'ON' state of the voice switch and a second position defining an effectively 'OFF' state of the voice switch.

The logic circuit (L-1) is operated as follows: (1) it is set to control its associated voice switch (SW-1) to turn on upon the receipt of a first (logic '1') signal from an associated comparator (C-1) and the receipt of a second (logic '0') signal from the other comparator (C-2); it is reset to control the voice switch to turn off upon the receipt of a second signal from an associated comparator and the receipt of a first signal from the other comparator; and its logic state is inverted to change the position or state of the voice switch upon the receipt of first signals from both the associated comparator and the other comparator.

A typical operation of the system is as follows:

Assuming that while no effective level voice signal exists on the transmission lines, and either of the comparators is producing a second signal, and each logic circuit is receiving the second signal at either of its control inputs, the logic circuit L-1 is applying an 'OFF' signal to the voice switch SW-1 and logic circuit L-2 is applying an 'ON' signal to the voice switch SW-2, and thus, the switch SW-1 is 'ON' but the switch SW-2 is 'OFF'; however, the initial condition of the voice switches is not important.

For simplification and clarification of description, the term 'first signal' produced by the comparator will be hereinafter referred to as a logic '1', and the term 'second signal' as a logic '0'.

Under such conditions, i.e. SW-1 is OFF and SW-2 is ON, when a user at one of the stations, for example, the station ST-1 starts to insert a voice message into the microphone MC-1, the output of the microphone increases so as to become greater than the input to the loudspeaker SP-1. Then, the comparator C-1 produces a logic '1' signal which is applied to the logic circuit L-1 which is, in turn, set to turn on the voice switch SW-1 so as to thereby transmit the voice message from the station ST-1 to the other station ST-2. At the same time, the logic circuit ST-2 receives logic '0' and '1' signals at its first and second control inputs, respectively, and is responsively reset to turn off the switch SW-2 so as to thereby prevent the formation of a closed loop for voice signals.

Under such conditions, when a second user at the station ST-2 starts to insert a new message into the microphone MC-2, the output of the microphone increases in addition to the output produced by the acoustic coupling with the loudspeaker SP-2 which has been receiving the voice message from the station ST-1. When the output of the microphone MC-2 becomes greater than the input to the loudspeaker SP-2, the comparator C-2 produces and applies a logic '1' signal to J input of the logic circuit L-2 and K input of the logic circuit L-1. Responsively, the state of the logic circuit L-1 is inverted so as to change the position of switch SW-1, that is, turn off the switch SW-1, so as to thereby interrupt the voice message transmission from the station ST-1 to the station ST-2. Simultaneously, the state of the logic circuit L-2 is also inverted so as to change the position of switch SW-2. However, this inverting turns on the switch SW-1 because this switch has previously been in an 'OFF' condition. Accordingly, the newly inserted voice message is transmitted from the station ST-2 to the station ST-1 while interrupting the message transmission from the station ST-1 to the station ST-2.

It is noted here that the principle which is recognized from the above-noted basic voice switching control system as shown in FIG. 1 is easily applied or expanded to a multi voice switching control system for controlling three or more different voice signals.

Such a multi voice switching control system needs a number of $N(N \geq 3)$ voice switching control units (first through Nth units) each of which is similar to a unit USC-1 or USC-2 as shown in FIG. 1. The output of each voice switch SW-i is connected to all the loudspeakers but the loudspeaker SP-i of the station ST-i (a group of these connected loudspeakers may be regarded as complementary loudspeakers $\overline{SP\text{-}i}$). The output of each comparator C-i is connected to J input of a logic circuit L-i and connected to K input of the other logic circuits $\overline{L\text{-}i}$.

Such complementary connections in cooperation with the simple design of each voice switching control unit permits the two way voice communication system to serve as a conference communication system by which a conference is held. This feature is highly advantageous.

Figure 2:
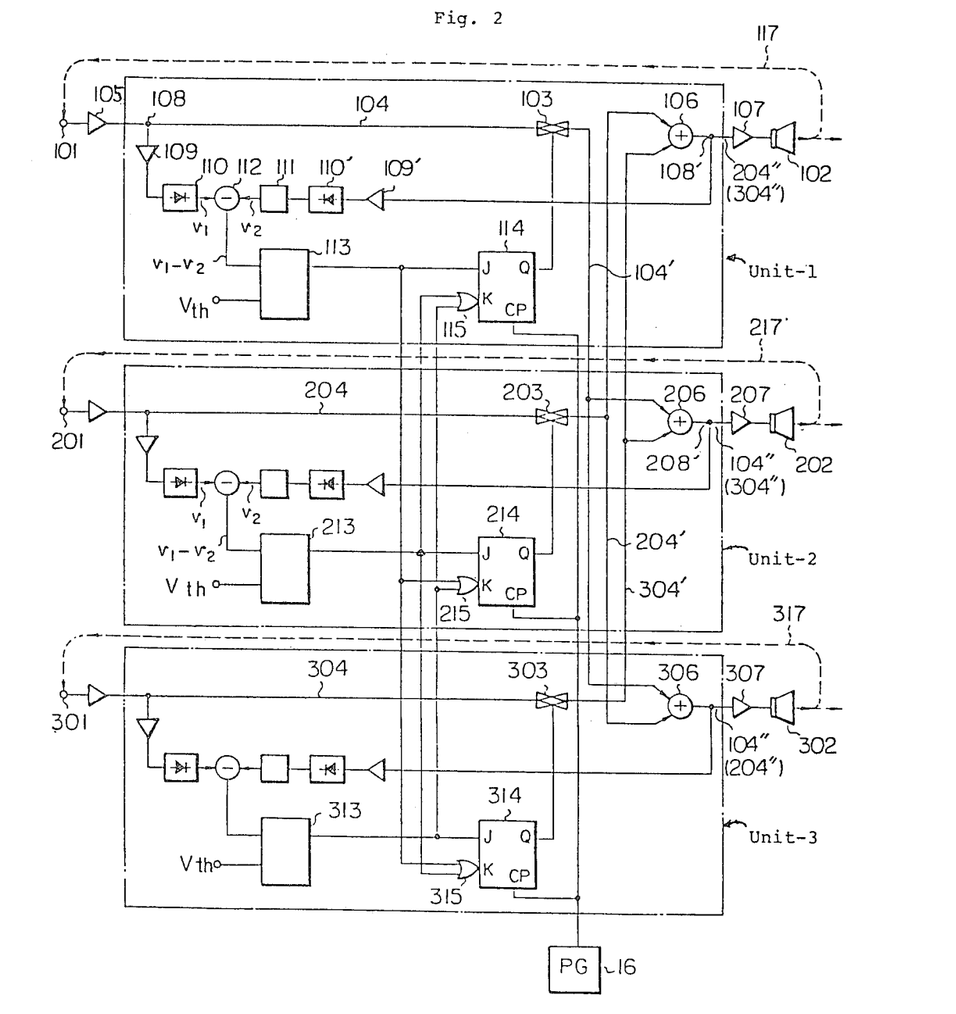
FIG. 2 is a detailed diagram of a preferred embodiment of a voice switching control system for controlling three voice switches.

Referring now to FIG. 2, a detailed block diagram of a preferred embodiment of a voice switching control system for controlling voice signals between three stations is shown.

In the illustrative embodiment, the control system comprises three identical voice switching control units 1 through 3. Unit 1 is assigned to a first station including a microphone 101 and loudspeaker 102. Similarly unit 2 is assigned to a second station including a microphone 201 and a loudspeaker 202, and unit 3 is assigned to third station including a microphone 301 and a loudspeaker 302.

Since each unit is identical, the following description refers only to unit 1 except when a reference to the entire voice switching control system or to relationship between units is needed.

Unit 1 includes a voice switch 103, the input of which is connected to the output of the microphone 101 of the first station through a voice signal transmission line 104 via an amplifier 105, and the output of which is connected to the inputs of the loudspeakers 202 and 302 of the second and third stations through a line 104' to voice signal adder elements 206 and 306 to a line 104" to voice signal amplifiers 207 and 307. It is noted that each of voice switches (103, 203 and 303) is disposed in a 'different' transmission line or channel established between the microphone of one of the stations and the loudspeakers of the remaining stations.

Unit 1 includes a pair of first and second sensing circuits for sensing a voice signal output from the microphone 101 of the first station at a point 108 on the line 104 and a voice signal input to the loudspeaker 102 of the same station at a point 108' on the line 204" (304") after the voice signal adder element 106, respectively. The sensing circuits include a first amplifier 109 in the first sensing line and a second amplifier 109' in the second sensing line. Gains of these amplifiers are selected so that a comparator (which will be described after this) does not malfunction due to an acoustic coupling between the loudspeaker 102 and the microphone 101. Preferably, the filtering function of the amplifier 109 is to provide compensation for the frequency characteristics of the acoustic coupling between the loudspeaker and the microphone. The filtering characteristic of the amplifier 109 is determined taking into consideration the sound structure of the language spoken by the users of the system, particularly the frequency distribution of the voice with which the speech is started. For example, where the language to be used is Japanese, the amplifier 109 preferably has a high-pass filtering function for passing signal frequencies higher than, for example, ten and several hundred Hertz. The first amplifier 109 is connected to a first rectifying circuit 110 which rectifies a first amplified, sensed, voice signal from the microphone 101. Similarly, the second amplifier 109' is connected to a second rectifying circuit 110' for rectifying a second, amplified, sensed, voice signal of the loudspeaker 102. The second sensing circuit further includes a smoothing circuit 111 for smoothing the second rectified signal. The smoothing circuit 111 produces an output which follows the input signal without delay while the input signal is increasing in level. However, after the input signal has reached the peak value (and while signals less than the peak value are being received), the output is maintained at a constant value for a relatively long time contact (e.g. 0.1 second). This rapid following characteristic for increasing input signals and maintaining characteristic for maintaining the peak value for a long time serves to invert the comparator without delay and stabilize the inverted condition thereof in order to stabilize the inverted condition or state of the J-K Flip-Flops which will be described.

In constrast with the second sensing circuit, which has a smoothing circuit as described above, the first sensing circuit does not include any smoothing circuit to effectively introduce a delay in the turning-on of the associated voice switch.

Unit 1 includes a comparator comprising a subtracting element 112 and a comparing circuit 113. The subtracting element 112 produces a difference signal between the non-smoothed signal $V_1$ from the first sensing circuit and the smoothed signal $V_2$ from the second sensing circuit by subtracting either the signal $V_2$ from the signal $V_1$ or subtracting the signal $V_1$ from the signal $V_2$. The difference signal $(V_1-V_2)$ or $(V_2-V_1)$ is compared with a reference or threshold voltage signal Vth by the comparing circuit 113. The threshold voltage Vth has either an appropriate positive or negative value depending upon whether the difference signal represents $(V_1-V_2)$ or $(V_2-V_1)$, respectively.

The comparing circuit 113 outputs a logic '1' signal when the $(V_1-V_2)$ signal is greater than a positive threshold voltage Vth (or the $(V_2-V_1)$ signal is less than a negative Vth), and outputs a logic '0' signal when the $(V_1-V_2)$ signal is less than the positive threshold voltage (or $(V_2-V_1)$ is greater than the negative Vth).

The absolute value of the threshold voltage $|Vth|$ is determined by the consideration that larger values advantageously increase the operational stability but disadvantageously impair the response to a new insertion of voice signals into the microphone while smaller values lower the stability but establish a positive response.

In order to simplify the following description, the limitation that the subtraction element produces a $(V_1-V_2)$ signal and thus the comparing circuit compares the $(V_1-V_2)$ signal with a positive threshold voltage Vth will be assumed.

Each output from the comparator is connected to the J input of an associated J-K Flip-Flop and to the K inputs of the remaining J-K Flip-Flops. For example, the output of the comparing circuit 113 of unit 1 is connected to the J input of a J-K Flip-Flop 114 of unit 1 and to the K inputs of J-K Flip-Flops 214 and 314 via associated OR elements 215 and 315.

Each J-K Flip-Flop operates as a conventional J-K Flip-Flop, and follows the Truth Table noted below.

| Truth Table | | |
|---|---|---|
| tn | | tn + 1 |
| J | K | Q |
| (0) | (0) | (Qn) |
| 0 | 1 | 0 |
| 1 | 0 | 1 |
| 1 | 1 | $\overline{Qn}$ |

Where:
tn = Bit time before clock pulse
tn + 1 = Bit time after clock pulse

Each J-K Flip-Flop is driven by clock pulses generated by a suitable pulse generator 16. A relatively high repetition rate of clock pulses is selected to speed up the response of the J-K Flip-Flops. The practical repetition rate may preferably be several tens of kilo-Hertz or higher.

The Q output of each J-K Flip-Flop is connected to the control electrode or gate of the associated voice switch. For example, the voice switch 103 of unit 1 is connected to the Q output of J-K Flip-Flop 114 of unit 1.

The voice switch 103 is triggered into conduction and remains in its 'ON' state when and whenever the Q output of J-K Flip-Flop 114 becomes and remains a logic '1' (e.g. 'High' level), and is turned off and remains in its 'OFF' state when and whenever Q output of J-K Flip-Flop 114 becomes and remains a logic '0' (e.g. 'Low' level). The voice switch may comprise a controllable semiconductor switch such as a field effect transistor.

A typical operation of the voice signal control system shown in FIG. 2 is as follows:

Initially, it is assumed that no effective voice signal exists in any one of the voice signal transmission channels between the three stations, thus causing either of the comparators to apply a logic '0' signal to J and K inputs of all the J-K Flip-Flops, and that only the Flip-Flop 214 outputs a logic '1' signal, thus controlling the voice switch 203 so as to be in its 'ON' position while the Flip-Flops 114 and 314 output a logic '0' signal, thus controlling the voice switches 103 and 303 so as to be in their 'OFF' position.

Under such a condition, when a user at the first station starts to insert a voice message into the microphone 101, the insertion causes $(V_1-V_2)$ signal defining a control input to the comparing circuit 113 so as to increase its value to a level higher than the level of the threshold voltage Vth. Responsively, the output of the comparing circuit 113 switches to a logic '1' signal which is applied to the J input of the Flip-Flop 114 and to the K inputs of the Flip-Flops 214 and 314. As a result, the first Flip-Flop 114 receives J=1 and K=0 inputs, and the second and third Flip-Flops 214 and 314 receives J=0 and K=1 inputs. Referring to the previously noted Truth Table of a J-K Flip-Flop, upon the receipt of a subsequent first clock pulse, the first J-K Flip-Flop 114 is set to produce a logic '1' signal at its Q output so as to turn on the first voice switch 103, thus enabling the inserted voice message to be transmitted to the second and third loudspeakers 202 and 302. At the same time, the second J-K Flip-Flop 214 is reset to turn off the second voice switch 203. During this period, the third J-K FLip-Flop 314 remains reset to control the third voice switch 303 so as to be in its 'OFF' position.

The 'OFF' state of the voice switches 203 and 303 prevents the system from forming any closed loop for voice signals.

Under such a condition, when a second user at the second station inserts a new voice message into the microphone 201, the output of the microphone 201 increases in addition to the output produced by the acoustic coupling to the loudspeaker 202 (as shown in a dotted line 217) which has been receiving the voice message from the first station. Thus, the $(V_1-V_2)$ input signal to the second comparing circuit 213 becomes greater than the threshold voltage Vth to thereby cause the comparing circuit 213 to output a logic '1' signal. Responsively, the J-K input condition of the second Flip-Flop 214 is changed into J=1 and K=1 from J=0 and K=1. At the same time, the J-K input condition of the first Flip-Flop 114 is changed into J=1 and K=1 from J=1 and K=0. Referring again to the Truth Table of a J-K Flip-Flop, after a subsequent first clock pulse, the state of the second Flip-Flop 214 is inverted to produce a logic '1' signal at its Q output to thereby turn on the second voice switch 203 while the state of the first Flip-Flop 114 is also inverted, which inverting, however, causes its Q output to produce a logic '0' signal to thereby turn off the first voice switch 103.

It is now understood that the inverting of the state of the first J-K Flip-Flop 114 serves to turn off the first voice switch 103 and that the inverting of the state of the second J-K Flip-Flop 214 serves to turn on the second voice switch 203.

The 'OFF' state of the first voice switch 103 and the 'ON' state of the second voice switch 203 must be retained or stabilized to thereby ensure the interruption of the first voice message from the first microphone 101 and to establish the transmission of the second voice message newly inserted into the second microphone 201.

Such stabilization is achieved by inverting the output of the first comparing circuit 113, thus applying J=0 and K=1 inputs to the first J-K Flip-Flop 114 and applying J=1 and K=0 inputs to the second J-K Flip-Flop. More specifically, the sensing circuit of unit 1 senses a voice signal increase at the point 108' on the input line to the first loudspeaker 102 immediately after the turning-on of the second voice switch 203. The rapid increase in the sensed voltage $V_2$ opposes the sensed voltage $V_1$ from the first microphone 101, thus lowering the $(V_1-V_2)$ signal to a value which is less than the threshold voltage Vth, which causes the first comparing circuit 113 to output a logic '0' signal. Responsively, the first J-K Flip-Flop 114 receives a J=0 input under and a K=1 input and the second J-K Flip-Flop 214 receives a K=0 input and a J=1 input. Upon receipt of a subsequent clock pulse, the first Flip-Flop is reset to establish the 'OFF' state of the first voice switch 103 and the second Flip-Flop is set to establish the 'ON' state of the second voice switch 203.

During the period of the above operation, the third Flip-Flop 314 remains reset so as to control the third voice switch 303 to be in its 'OFF' state when J=0 and K=1 are the input conditions of the third Flip-Flop.

In this manner, the new voice message inserted into the second microphone 201 is positively transmitted to the first and third loudspeakers 102 and 302 while interrupting the transmission of the first voice message which has been inserted in the first microphone 101. In the illustrative system, the time required to establish or stabilize the OFF condition of switch 103 and the ON condition of switch 203 by the inverting of the output of first comparing circuit 113 into a logic "0" output from a logic "1" after the output of the second comparing circuit 213 is inverted so as to output a logic "1" from logic "0" by the insertion of new message may be negligible (the entire time including the time required for amplifier 207 to establish an amplified voice signal is about one milli-second).

Figure 3:
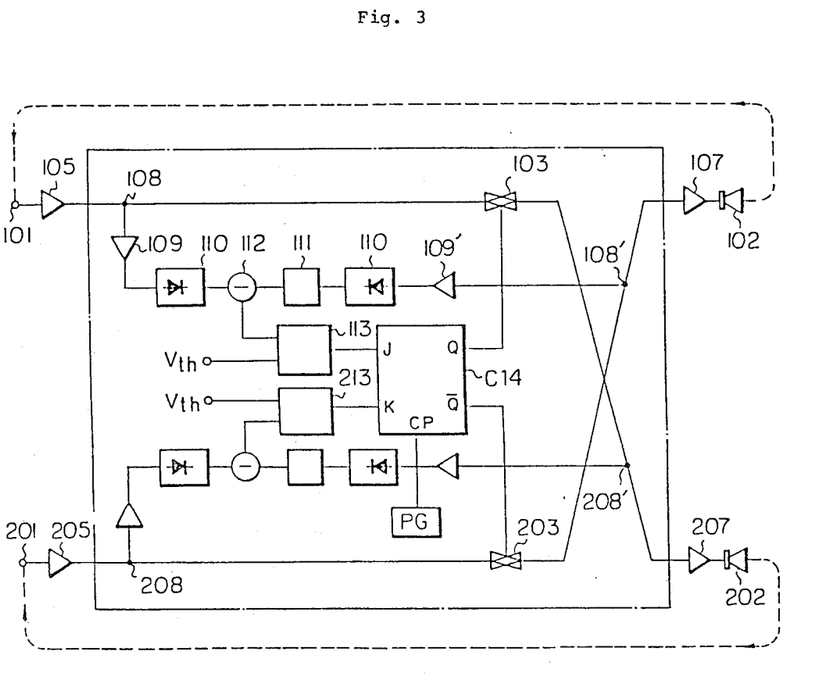
FIG. 3 is a detailed diagram of a preferred embodiment of a voice switching control system for controlling two voice signals.

Referring now to FIG. 3, a preferred embodiment of a voice switching control system for controlling voice signals between a pair of stations is shown in a block diagram form. With respect to the same circuit elements, the same reference numerals are used in both FIG. 3 and FIG. 2. However, it is noted that in the embodiment of FIG. 3 a common, single J-K Flip-Flop C14 is advantageously used to control both the first and the second voice switches 103 and 203. The common J-K Flip-Flop C14 has its J and K inputs connected to the first comparing circuit 113 and the second comparing circuit 213, respectively and its Q and $\overline{Q}$ outputs are connected to the first and second voice switches 103 and 203, respectively.

Such an arrangement A of the single J-K Flip-Flop is logically equivalent to an arrangement A' comprising a sub-arrangement $A_1$ of a first J-K Flip-Flop and a sub-arrangement $A_2$ of a second J-K Flip-Flop in which the J input, K input and Q output of the first J-K Flip-Flop are connected to the first comparing circuit, the second comparing circuit and the first voice switch, respectively while the J input, K input and $\overline{Q}$ output of the second J-K Flip-Flop are connected to the first comparing circuit, the second comparing circuit and the second voice switch, respectively. Furthermore, the sub-arrangement $A_2$ of the second Flip-Flop is operationally equal to an arrangement $A'_2$ wherein the J input, K input and Q output of the second J-K Flip-Flop are connected to the second comparing circuit, first comparing circuit and the second voice switch, respectively.

Therefore, the arrangement A of the single Flip-Flop C14 is operationally equal to the arrangement A" comprising the sub-arrangement $A_1$ of the first J-K Flip-Flop and the sub-arrangement $A'_2$ of the second J-K Flip-Flop. The arrangement A" is identical with the arrangement of a pair of J-K Flip-Flops as shown in FIG. 1.

Therefore, the voice switching control system employing the common and single Flip-Flop, as arranged in FIG. 3 is operated in a similar manner as discussed with reference to FIG. 1 while preserving various advantages given by the embodiment of FIG. 2.

What is claimed is:

1. A voice switching control system for controlling voice signals for transmission between stations, each station including a microphone and a loudspeaker, comprising:
   (a) at least two voice switches disposed in different voice signal transmission channels, respectively;
   (b) each of said transmission channels being operatively connected between the microphone of one of the stations and the loudspeakers of the other stations;
   (c) means for sensing each output voice signal of the microphones of the stations and each input voice signal to the loudspeakers of the stations;
   (d) comparators each for comparing a signal representing the sensed output from the microphone of one of the stations with a signal representing the sensed input to the loudspeaker of the same station;
   (e) each one of the comparators selectively producing either a first signal or a second signal in accordance with the relative amplitudes of the output voice signal of the associated microphone and the input voice signal of the associated loudspeaker;
   (f) logic circuits each for controlling the associated voice switch at a selected one of two positions, a first position defining an ON state of the voice switch and a second position defining an OFF state of the voice switch;
   (g) each one of the logic circuits having a first control input for receiving the output of the associated comparator and a second control input for receiving the output of the other comparators; and
   (h) each one of the logic circuits being placed in a set state so as to control the associated voice switch so as to be in its first position upon the receipt, by the first control input, of the first signal from the associated comparator and the receipt, by the second control input, of the second signal from any one of the other comparators, each one of the logic circuits being placed in a reset state so as to control the associated voice switch so as to be in its second position upon the receipt, by the first control input, of the second signal from the associated comparator and the receipt, by the second control input, of the first signal from any one of the other comparators, each one of the logic circuits having its plate changed so as to control the associated voice switch so as to change the position thereof upon the receipt, by the first control input, of the first signal from the associated comparator and the receipt, by the second control input, of the first signal from any one of the other comparators, whereby a voice message newly inserted into a microphone of any one of the stations serves to interrupt another voice message which has been transmitted to the loudspeaker associated with the microphone, and the newly inserted message is transmitted to any other station without attenuation of the voice signal introduced by the associated voice signal switch.

2. The control system recited in claim 1, wherein there are at least three control units, each unit including one of said sensing means, one of said comparators and one of said logic circuits, whereby at least three groups of persons disposed at different stations can hold a telephone conference communication.

3. The control system recited in claim 1, wherein each one of said logic circuits comprises a J-K Flip-Flop.

4. The control system recited in claim 1, wherein each one of said loudspeaker input voice signal sensing means consists of an amplifier, a rectifying circuit and a smoothing circuit while each one of said microphone output voice signal sensing means consists only of an amplifier and a rectifying means, whereby said newly inserted voice message is transmitted to said any other station without an effective delay in turning-on of the associated voice switch.

5. The control system as recited in claim 1, wherein each of said comparators comprises a subtracting element for producing a subtracted signal between the sensed loudspeaker input signal and the sensed microphone output signal, and a comparing circuit for comparing the subtracted signal with a predetermined threshold voltage.

6. The control system recited in claim 1, adapted to control voice signals for transmission between a pair of said stations, wherein said logic circuits comprise a single J-K Flip-Flop having a J input connected to one of said comparators and a K input connected to the other comparator, said J-K Flip-Flop having a Q output connected to the control gate of one of said voice switches and a $\overline{Q}$ output connected to the other voice switch.

* * * * *

UNITED STATES PATENT AND TRADEMARK OFFICE
CERTIFICATE OF CORRECTION

PATENT NO. : 4,359,606
DATED : November 16, 1982
INVENTOR(S) : Shoichi SATO

It is certified that error appears in the above—identified patent and that said Letters Patent is hereby corrected as shown below:

In the cover page of the patent at the space provided for Inventor [75] please correct to read: --Shoichi Sato--.

Signed and Sealed this

Twenty-sixth Day of June 1984

[SEAL]

Attest:

GERALD J. MOSSINGHOFF

Attesting Officer

Commissioner of Patents and Trademarks